United States Patent
Hur et al.

(10) Patent No.: US 9,276,641 B2
(45) Date of Patent: Mar. 1, 2016

(54) WIRELESS POWER TRANSMISSION METHOD FOR PREVENTING FREQUENCY INTERFERENCE

(75) Inventors: Namwoong Hur, Suwon (KR); Singu Kim, Suwon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 883 days.

(21) Appl. No.: 13/308,988

(22) Filed: Dec. 1, 2011

(65) Prior Publication Data
US 2012/0280574 A1 Nov. 8, 2012

(30) Foreign Application Priority Data
May 4, 2011 (KR) .......................... 10-2011-42266

(51) Int. Cl.
| | |
|---|---|
| H01F 27/42 | (2006.01) |
| H01F 37/00 | (2006.01) |
| H01F 38/00 | (2006.01) |
| H04B 5/00 | (2006.01) |
| H02J 17/00 | (2006.01) |
| H04W 52/24 | (2009.01) |
| B60L 11/18 | (2006.01) |

(52) U.S. Cl.
CPC ............ *H04B 5/0037* (2013.01); *B60L 11/182* (2013.01); *H02J 17/00* (2013.01); *H04W 52/243* (2013.01); *B60L 2270/147* (2013.01)

(58) Field of Classification Search
CPC ........... H02J 5/005; H02J 7/025; H02J 17/00; H01F 38/14; H04B 1/00; H04K 1/10; H04L 27/28; H04W 72/04; H04Q 7/20
USPC ............. 307/104, 10.1, 9.1, 82, 39; 370/329, 370/328, 252; 375/260; 455/67.11, 509
See application file for complete search history.

(56) References Cited

U.S. PATENT DOCUMENTS

| | | | |
|---|---|---|---|
| 7,212,110 B1 | 5/2007 | Martin et al. | |
| 2007/0105573 A1* | 5/2007 | Gupta et al. | 455/509 |
| 2008/0037665 A1* | 2/2008 | Maeki et al. | 375/260 |
| 2009/0281678 A1 | 11/2009 | Wakamatsu | |
| 2010/0081391 A1* | 4/2010 | Suzuki et al. | 455/67.11 |
| 2012/0213162 A1* | 8/2012 | Koo et al. | 370/329 |

FOREIGN PATENT DOCUMENTS

| | | |
|---|---|---|
| JP | 2006034044 A | 2/2006 |
| JP | 2006-216660 A | 8/2006 |
| JP | 2008-206297 A | 9/2008 |
| JP | 2009278707 A | 11/2009 |
| JP | 2011-024290 A | 2/2011 |
| WO | 2010-131728 A1 | 11/2010 |

* cited by examiner

*Primary Examiner* — Jared Fureman
*Assistant Examiner* — Jagdeep Dhillon
(74) *Attorney, Agent, or Firm* — Mintz Levin Cohn Ferris Glovsky and Popeo, P.C.; Peter F. Corless

(57) ABSTRACT

The present invention relates to a wireless power transmission method for preventing frequency interference, and more particularly, to a wireless power transmitter and a wireless power transmission method for preventing frequency interference that flexibly controls an operation of the wireless power transmitter in order to avoid signal interference and collision between different apparatuses using frequencies adjacent to a frequency band of a power signal transmitted from the wireless power transmitter.

8 Claims, 3 Drawing Sheets

WIRELESS POWER TRANSMISSION METHOD FOR PREVENTING FREQUENCY INTERFERENCE

CROSS-REFERENCE TO RELATED APPLICATIONS

This application claims priority under 35 U.S.C. §119 to Korean Patent Application No. 10-2011-42266, filed on May 4, 2011, in the Korean Intellectual Property Office, the disclosure of which is incorporated herein by reference in its entirety.

BACKGROUND OF THE INVENTION

1. Field of the Invention

The present invention relates to a wireless power transmission method for preventing frequency interference, and more particularly to a wireless power transmitter and a wireless power transmission method for preventing frequency interference that flexibly controls an operation of the wireless power transmitter in order to avoid signal interference and collision between different apparatuses using frequencies adjacent to a frequency band of a power signal transmitted from the wireless power transmitter.

2. Description of the Related Art

In general, a wireless power transmission system is used as a technology for transmitting power between apparatuses spaced apart from each other by using an induced electromotive force mechanism. The wireless power transmission system enables power transmission between apparatuses placed at separated positions by using a predetermined range of frequency (in general, a frequency in the range of 100 to 210 Khz) and since the wireless power transmission system transmits power by using a wireless signal, if a signal for transmitting power is close to another apparatus using a frequency adjacent to a used frequency band, there is a possibility that malfunction will occur due to frequency interference.

Therefore, in order to avoid frequency inference and collision, a multichannel technology is generally used. However, in the wireless power transmission field, a frequency band which can be practically used is extremely limited. Therefore, there is a disadvantage in that changing and using the frequency variously is limited in order to transmit power wirelessly. Further, if the frequency is changed, power transmission efficiency is consequently varied with the change of the used frequency and the variation range is significantly large, such that it is practically difficult to apply the frequency.

In addition, as another method, a method of shielding electromagnetic waves is used in order to reduce a physical area influenced by the electromagnetic waves for the purpose of preventing frequency interference between different apparatuses. However, this method has a disadvantage in that an additional cost is generated because a shielding member needs to be additionally installed in order to apply an electromagnetic wave shielding structure and if the design of a wireless power transmission structure needs to be changed, this method has another disadvantage in that a shielding structure applied before the design change needs to be redesigned by remeasuring a radiation pattern whenever the design of the wireless power transmitter is changed. Therefore, there is disadvantage in that the method using the electromagnetic wave shielding is complicated to develop and takes a long time to develop.

SUMMARY OF THE INVENTION

The present invention has been made in an effort to provide a wireless power transmitter for transmitting power wirelessly, and a wireless power transmission method for preventing frequency interference that prevents frequency interference and collision by setting the wireless power transmitter and a plurality of adjacent-frequency-using apparatuses to be alternately operated when the plurality of adjacent-frequency-using apparatuses using frequencies adjacent to a frequency used by the wireless power transmitter operate.

An exemplary embodiment of the present invention provides a wireless power transmission method in a wireless power system including a wireless power transmitter and an adjacent-frequency-using apparatus, the method including: generating and transmitting, by the wireless power transmitter, a power signal to the adjacent-frequency-using apparatus; receiving, by the adjacent-frequency-using apparatus, the power signal and obtaining power from the power signal; and generating and transmitting, by the adjacent-frequency-using apparatus, a power transmission restriction signal to the wireless power transmitter when preparing for an operation start.

The method may further include stopping, by the wireless power transmitter, operating when receiving the power transmission restriction signal.

The generating and transmitting, by the adjacent-frequency-using apparatus, the power transmission restriction signal to the wireless power transmitter when preparing for an operation start step may further include firstly transmitting the power transmission restriction signal and standing by for a predetermined stand-by time and thereafter, starting to operate.

In the generating and transmitting, by the adjacent-frequency-using apparatus, the power transmission restriction signal to the wireless power transmitter when the adjacent-frequency-using apparatus prepares for an operation start step, the adjacent-frequency-using apparatus may consistently transmit the power transmission restriction signal to the wireless power transmitter.

The method may further include: stopping the transmission of the power transmission restriction signal when the operation of the adjacent-frequency-using apparatus stops; and resuming generation and transmission, by the wireless power transmitter, of the power signal as the reception of the power transmission restriction signal stops.

According to exemplary embodiments of the present invention configured as above, it is possible to prevent frequency interference and collision only by connection of an input terminal of a wireless power transmitter and software modification and connection of output terminals of adjacent-frequency-using apparatuses and software modification in order to prevent a power signal transmitted from the wireless power transmitter from being interfered.

Further, since no additional component is added to the configuration of the wireless power transmitter in the related art in order to prevent frequency interference and collision, an additional cost is not generated for a configuration to prevent frequency interference in wireless power transmission.

DETAILED DESCRIPTION OF THE EMBODIMENTS

Hereinafter, exemplary embodiments of the present invention will be described in detail with reference to the accompanying drawings.

However, the accompanying drawings are provided as examples in order to fully transfer the spirit of the present invention to those skilled in the art. Therefore, the present invention is not limited to the accompanying drawings and may be implemented in various forms.

Further, unless terms are defined, they have meanings understood by those skilled in the art and known functions and configurations which may unnecessarily obscure the scope of the present invention will not be described in the following description and accompanying drawings.

Figure 1:
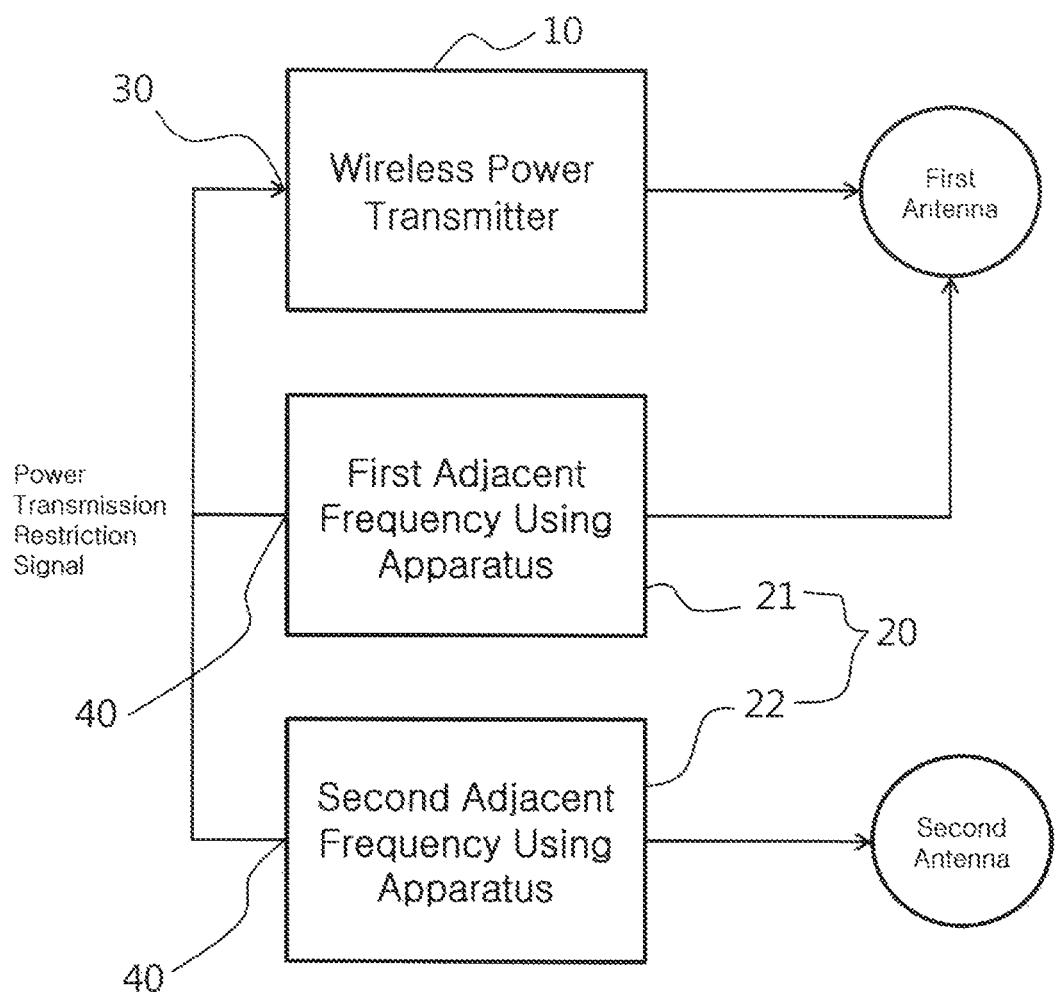
FIG. 1 is a block diagram showing a system that executes a wireless power transmission method for preventing frequency interference according to an exemplary embodiment of the present invention.

FIG. 1 is a block diagram showing a system that executes a wireless power transmission method for preventing frequency interference according to an exemplary embodiment of the present invention.

As shown in the figure, the system that executes a wireless power transmission method for preventing frequency interference according to the exemplary embodiment of the present invention includes a wireless power transmitter 10 generating and transmitting a power signal wirelessly by using a wireless power transmission technology and one or more adjacent-frequency-using apparatuses 20 adjacent to the wireless power transmitter 10 and operating by receiving the power signal transmitted from the wireless power transmitter 10. A first adjacent-frequency-using apparatus 21 and a second adjacent-frequency-using apparatus 22 are shown in FIG. 1, but the present invention is not limited thereto and besides, more adjacent-frequency-using apparatuses that may be constituted by other electronic apparatuses that are supplied with power by receiving the power signal transmitted from the wireless power transmitter 10 may be provided. Further, as shown in FIG. 1, the first adjacent-frequency-using apparatus 21 and the second adjacent-frequency-using apparatus 22 just have a difference in a transmission and reception antenna (a difference between a first antenna and a second antenna), however, may have the same mechanism that is supplied with power. Therefore, hereinafter, one or more adjacent-frequency-using apparatuses are referred to as an "adjacent-frequency-using apparatus 20".

Meanwhile, the term "wireless power transmission technology" refers to a known technology that transmits power wirelessly by using a power signal of a predetermined frequency band (e.g., a frequency in the range of 100 kHz to 210 kHz). The wireless power transmission technology receives the power signal through (i) the wireless power transmitter generating a power signal within the predetermined frequency band and transmitting the generated power signal through a transmitting unit and (ii) one or more apparatus's receiving units that are be supplied with power from the wireless power transmitter and convert a signal into power by using an inducted electromotive force of the power signal to receive the power.

The exemplary embodiment of the present invention uses the wireless power transmission technology.

As shown in the figures, the system adopting the wireless power transmission method for preventing frequency interference according to the exemplary embodiment of the present invention includes the wireless power transmitter 10 transmitting power. The wireless power transmitter 10 can include the configuration of the known wireless power transmitter 10, and more particularly, can include a control unit controlling an operation, a power supply unit supplying power, a power signal converting unit converting the supplied power into a power signal, and an antenna and an oscillation converter for transmitting the power signal to an adjacent-frequency-using apparatus. Since the configuration of the wireless power transmitter 10 is known, a detailed description thereof will be omitted.

The wireless power transmitter 10 according to the exemplary embodiment of the present invention stops transmission of the power signal to prevent frequency interference and collision at the time of using the adjacent-frequency-using apparatus 20 to be described below. Therefore, when the wireless power transmitter 10 according to the exemplary embodiment of the present invention receives a signal from the outside (a power transmission restriction signal), the wireless power transmitter 10 receives the corresponding signal to stop wireless power transmission while receiving the corresponding signal. To this end, the wireless power transmitter 10 according to the exemplary embodiment of the present invention may further include a signal receiving unit 30 (the antenna provided to transmit the power signal may be used as the signal receiving unit) capable of receiving the power transmission restriction signal in addition to the general configuration of the wireless power transmitter 10 of the related art and may allow the operation of the wireless power transmitter 10 to be controlled by transmitting the power transmission restriction signal received through the signal receiving unit 30 to the control unit. Therefore, when the control unit of the wireless power transmitter 10 receives the power transmission restriction signal from the signal receiving unit 30, the control unit controls the operation of the wireless power transmitter 10 to stop wireless power transmission.

The adjacent-frequency-using apparatus 20 operates by receiving power by using the power signal transmitted through the wireless power transmitter 10 by using the wireless power transmission technology. In other words, the adjacent-frequency-using apparatus 20 receives the power signal transmitted from the wireless power transmitter 10 as a wireless signal and converts the received power signal into the power by the induced electromotive force to receive the power. The adjacent-frequency-using apparatus 20 may be any apparatus or module that operates by using the power and in this case, the adjacent-frequency-using apparatus 20 may have the same configuration as even any known electronic apparatus except for a mechanism using the wireless power transmission technology that receives the power signal from the wireless power transmitter 10 and converts the power signal into the power.

The adjacent-frequency-using apparatus 20 includes a transmission antenna and transmits the wireless signal (a signal transmitted and received wirelessly to perform an original function of the adjacent-frequency-using apparatus). Further, the adjacent-frequency-using apparatus 20 uses a frequency band adjacent to a frequency band of a predetermined range used by the wireless power transmitter 10.

When the adjacent-frequency-using apparatus 20 transmits and receives the signal, the corresponding signal interferes and collides with the power signal transmitted from the wireless power transmitter 10, and as a result, the adjacent-frequency-using apparatus 20 according to the exemplary embodiment of the present invention generates and transmits the power transmission restriction signal for restricting signal transmission of the wireless power transmitter 10.

The power transmission restriction signal generated by the adjacent-frequency-using apparatus 20 is transmitted through a signal transmitting unit 40 provided in the adjacent-frequency-using apparatus 20 and the signal receiving unit 30 of the wireless power transmitter 10 receives the power transmission restriction signal and transmits the power transmission restriction signal to the control unit. In this case, the signal transmitting unit 40 and the signal receiving unit 30 may be the antenna transmitting the wireless signal of the adjacent-frequency -using apparatus 20 and may be further provided in addition to the antenna transmitting the wireless signal.

In the exemplary embodiment of the present invention, the signal transmitting unit 40 and the signal receiving unit 30 may transmit and receive the signal through wireless communications and in another exemplary embodiment of the present invention, the signal transmitting unit 40 and the signal receiving unit 30 may be connected to each other through wired communications.

In other words, the wireless power transmitter 10 and the adjacent-frequency-using apparatus 20 according to the exemplary embodiment of the present invention do not operate at the same time as each other and when at least one adjacent-frequency-using apparatus 20 starts to operate while the wireless power transmitter 10 operates, the adjacent-frequency-using apparatus 20 transmits the power transmission restriction signal to the wireless power transmitter 10 and the wireless power transmitter 10 receiving the power transmission restriction signal stops operating temporarily. In this case, it is preferable that the adjacent-frequency-using apparatus 20 consistently transmits the power transmission restriction signal while operating, and thus, the wireless power transmitter 10 is controlled to not operate while the adjacent-frequency-using apparatus operates.

Meanwhile, it is preferable that the adjacent -frequency-using apparatus 20 starts to operate after a predetermined set time after transmitting the power transmission restriction signal to prevent frequency interference and collision in advance.

Figure 2:
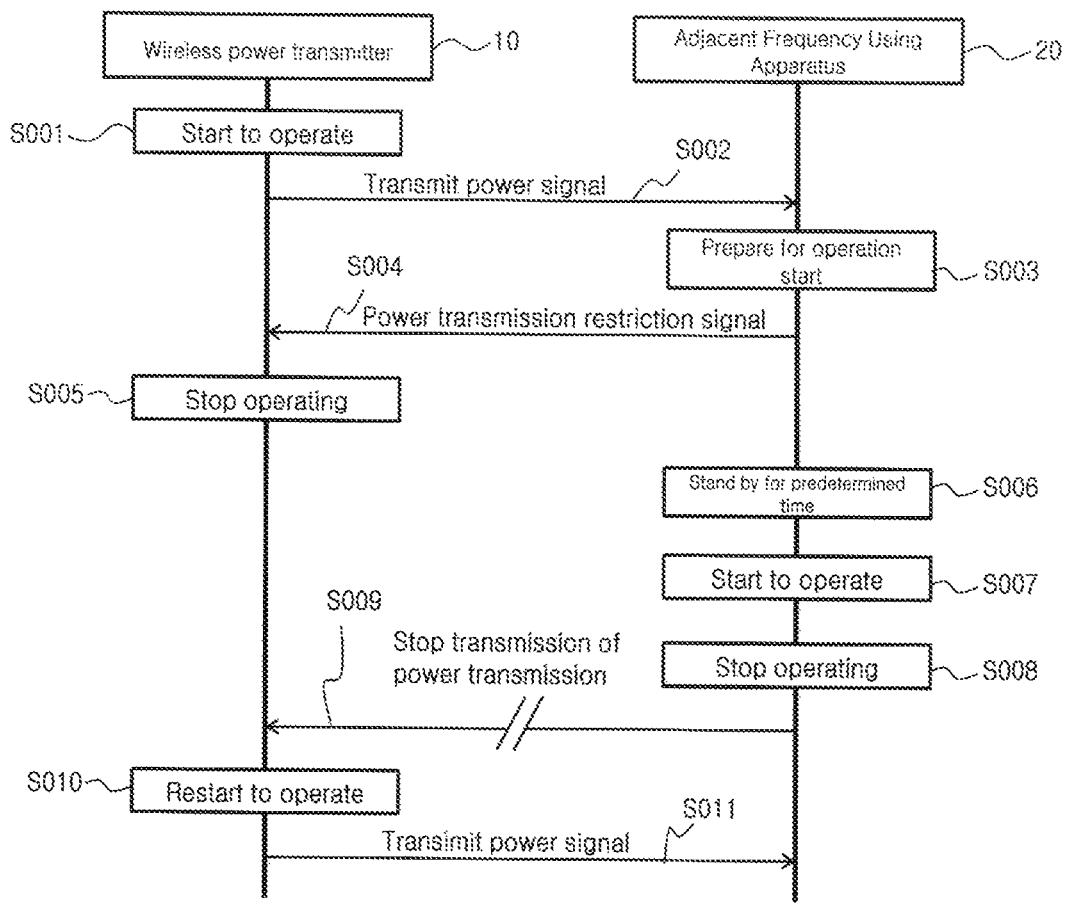
FIG. 2 is a flow chart showing a wireless power transmission method for preventing frequency interference according to an exemplary embodiment of the present invention.

FIG. 2 is a flow chart showing a wireless power transmission method for preventing frequency interference according to an exemplary embodiment of the present invention.

The adjacent-frequency-using apparatus 20 shown in FIG. 2 is shown as one block for convenience of description, but may correspond to one or more apparatuses.

When a wireless power transmitter 10 according to the exemplary embodiment of the present invention starts to operate (S001), the wireless power transmitter 10 generates a power signal by receiving power from a power supply unit to transmit the power signal through a transmitting unit (S002). The power signal transmitted from the wireless power transmitter 10 is transferred to an adjacent -frequency-using apparatus 20.

Meanwhile, the adjacent-frequency-using apparatus 20 receives the power signal from the wireless power transmitter 10 to receive the power by an induced electromotive force and may store the power through a power storing member autonomously provided therein or operate.

When the adjacent-frequency-using apparatus 20 prepares for an operation start (S003) (operated for the start of the operation by a user or controlled to start operating by another apparatus or a control unit), the adjacent-frequency-using apparatus 20 generates a power transmission restriction signal and transmits the generated power transmission restriction signal to the wireless power transmitter 10 through a signal transmitting unit 40 prior to starting to operate (S004). In the exemplary embodiment of the present invention, the adjacent-frequency-using apparatus 20 consistently transmits the power transmission restriction signal while operating.

When the wireless power transmitter 10 receives the power transmission restriction signal transmitted from the adjacent-frequency-using apparatus 20, from a signal receiving unit 30, the wireless power transmitter 10 transmits the received power transmission restriction signal to the control unit and the control unit controls the wireless power transmitter 10 to immediately stop operating as receiving the power transmission restriction signal (S005). Further, the wireless power transmitter 10 is preferably controlled to stop operating during the time when the power transmission restriction signal is consistently received as the power transmission restriction signal is consistently transmitted in the adjacent -frequency-using apparatus 20 and received by the wireless power transmitter 10.

Meanwhile, the adjacent-frequency-using apparatus 20 transmits the power transmission restriction signal in step S004 and thereafter, stands by for a predetermined stand-by time (S006). The stand-by time is to compensate for a time when the power transmission restriction signal is transmitted from the adjacent-frequency-using apparatus 20 and received by the wireless power transmitter 10 and the wireless power transmitter 10 stops operating as a result of the control unit and the transmission of the power signal stops, and during the stand-by time, the adjacent -frequency-using apparatus 20 transmits a signal after the wireless power transmitter 10 stops operating to prevent interference and collision between the signal transmitted from the wireless power transmitter 10 and the signal transmitted from the adjacent-frequency-using apparatus 20.

The adjacent-frequency-using apparatus 20 starts to operate and transmits a wireless signal after standing by for the predetermined stand-by time in step S006 (S007). In this case, preferably, the adjacent-frequency-using apparatus consistently outputs the power transmission restriction signal transmitted to the wireless power transmitter 10.

When the use of the adjacent-frequency-using apparatus 20 is completed, and thus, a power supply is turned off (S008), the transmission of the wireless signal from the adjacent-frequency-using apparatus 20 stops and the transmission of the power transmission restriction signal to the wireless power transmitter 10 also stops (S009). Accordingly, the wireless power transmitter 10 starts operating again (S010) and starts to transmit the power signal (S011) as the power transmission restriction signal which is being consistently received disappears.

Figure 3:
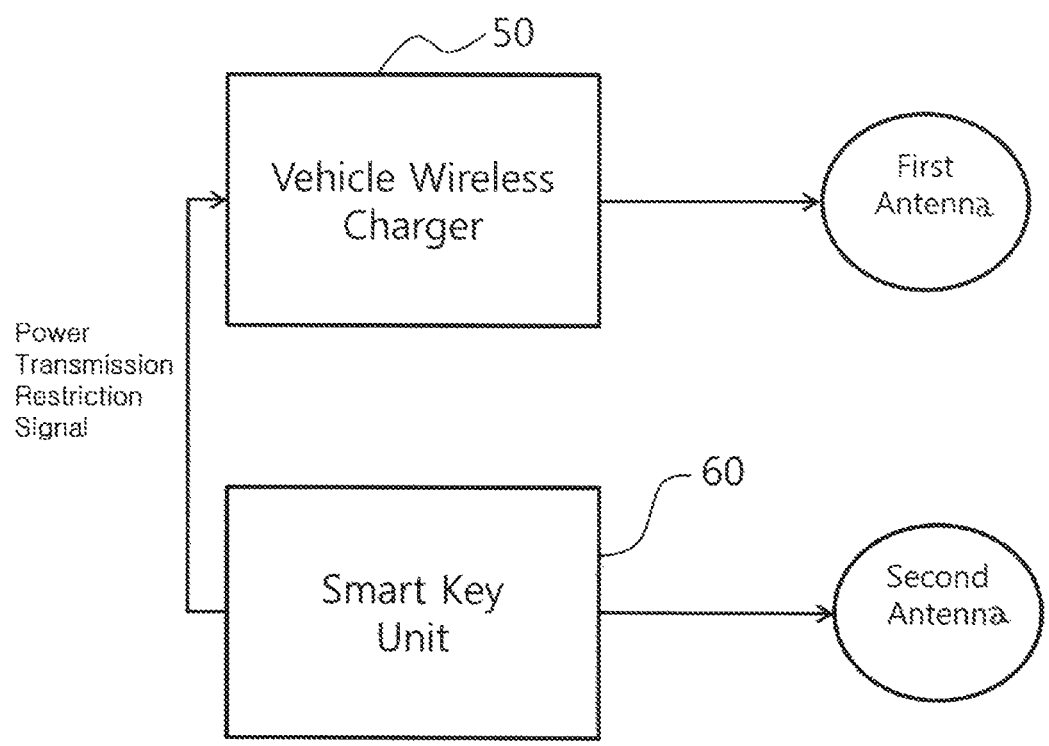
FIG. 3 is a block diagram showing a wireless power transmission method for preventing frequency interference according to an exemplary embodiment of the present invention.

FIG. 3 is a block diagram showing a wireless power transmission method for preventing frequency interference according to an exemplary embodiment of the present invention.

As shown in the figure, the exemplary embodiment of FIG. 3 includes a vehicle wireless charger 50 and a smart key (SMK) unit 60.

The vehicle wireless charger 50 transmits the power signal through a first antenna while the vehicle wireless charger 50 is operating and, in this case, the power signal interrupts searching an LF signal of the smart key unit 60 using a frequency adjacent to a frequency band used by the power signal (for example, using 125 KHz). Therefore, the smart key unit 60 transmits the power transmission restriction signal to the vehicle wireless charger 50 to control the vehicle wireless charger 50 to temporarily stop operating in order to easily search the LF signal. Accordingly, the smart key unit 60 searches the LF signal through a second antenna without signal interference after the vehicle wireless charger 50 stops operating.

When the searching operation of the LF signal in the smart key unit 60 is terminated, the smart key unit 60 stops the transmission of the power transmission restriction signal transmitted to the vehicle wireless charger 50 to control the vehicle wireless charger 50 to operate again.

As described above, although the exemplary embodiment of the wireless power transmission method for preventing frequency interference has been described in detail, it merely presents a specific example for helping understanding of the present invention and does not intend to limit the scope of the present invention. It will be apparent to those skilled in the art that various modifications and changes may be made without departing from the scope and spirit of the invention.

What is claimed is:

1. A wireless power transmission method for preventing frequency interference in a wireless power system including a wireless power charger and an adjacent-frequency-using apparatus, the method comprising:
   generating, by the vehicle wireless charger, a power signal, which is a low frequency signal;
   transmitting, by the vehicle wireless charger, the power signal through a first antenna while the vehicle wireless charger is operating;
   generating, by the adjacent-frequency-using apparatus, a power transmission restriction signal to cause the vehicle wireless charger to temporarily stop operating;
   transmitting, by the adjacent-frequency-using apparatus, the power transmission restriction signal; and
   searching, by the adjacent-frequency-using apparatus, the low frequency signal using a second antenna, without signal interference, while the operation of the vehicle wireless charger is temporarily stopped.

2. The wireless power transmission method of claim 1, wherein the adjacent-frequency-using apparatus includes a smart key unit.

3. The wireless power transmission method of claim 1, wherein the transmitting of the power signal, by the vehicle wireless charger, includes:
   interrupting the searching of the low frequency signal of the adjacent-frequency-using apparatus using a frequency adjacent to a frequency band used by the power signal.

4. The wireless power transmission method of claim 1, wherein the transmitting of the power transmission restriction signal, by the adjacent-frequency-using apparatus, includes:
   transmitting the power signal to the vehicle wireless charger.

5. The wireless power transmission method of claim 1, further comprising:
   stopping the transmission of the power transmission restriction signal of the adjacent-frequency-using apparatus to the vehicle wireless charger to cause the vehicle wireless charger to operate again, when the searching of the low frequency signal is terminated.

6. The wireless power transmission method of claim 1, wherein the transmitting of the power transmission restriction signal to the vehicle wireless charger includes:
   consistently transmitting, by the adjacent-frequency-using apparatus, the power transmission restriction signal while the adjacent-frequency-using apparatus is operating, thereby causing the vehicle wireless charger to not operate while the adjacent-frequency-using apparatus operates.

7. The wireless power transmission method of claim 1, wherein the transmitting of the power transmission restriction signal to the vehicle wireless charger includes:
   operating the adjacent-frequency-using apparatus after a predetermined time after transmitting the power transmission restriction signal.

8. The wireless power transmission method of claim 6, wherein the transmitting of the power transmission restriction signal to the vehicle wireless charger includes:
   operating the adjacent-frequency-using apparatus after a predetermined time after transmitting the power transmission restriction signal.

\* \* \* \* \*